Feb. 28, 1933.  W. R. GRISWOLD  1,899,324
INTERNAL COMBUSTION ENGINE
Filed Oct. 15, 1928
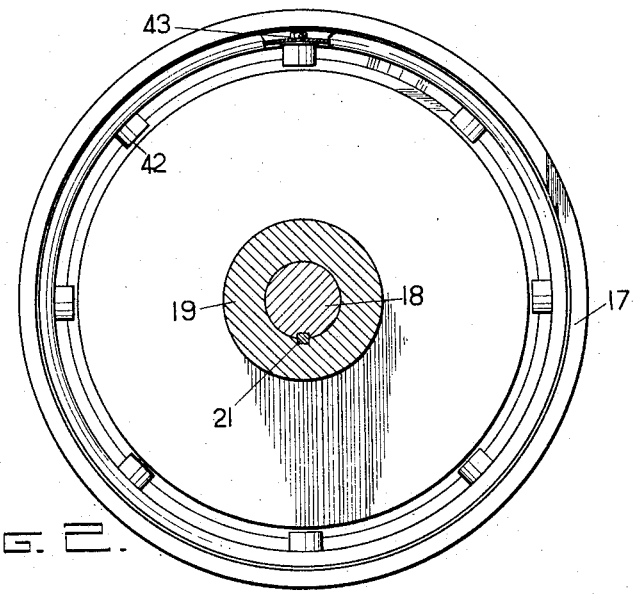
Fig. 2.
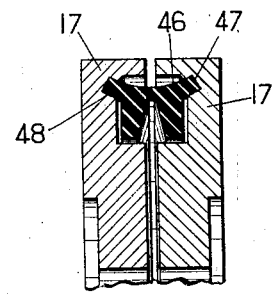
Fig. 4.
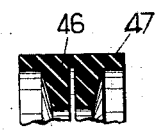
Fig. 5.
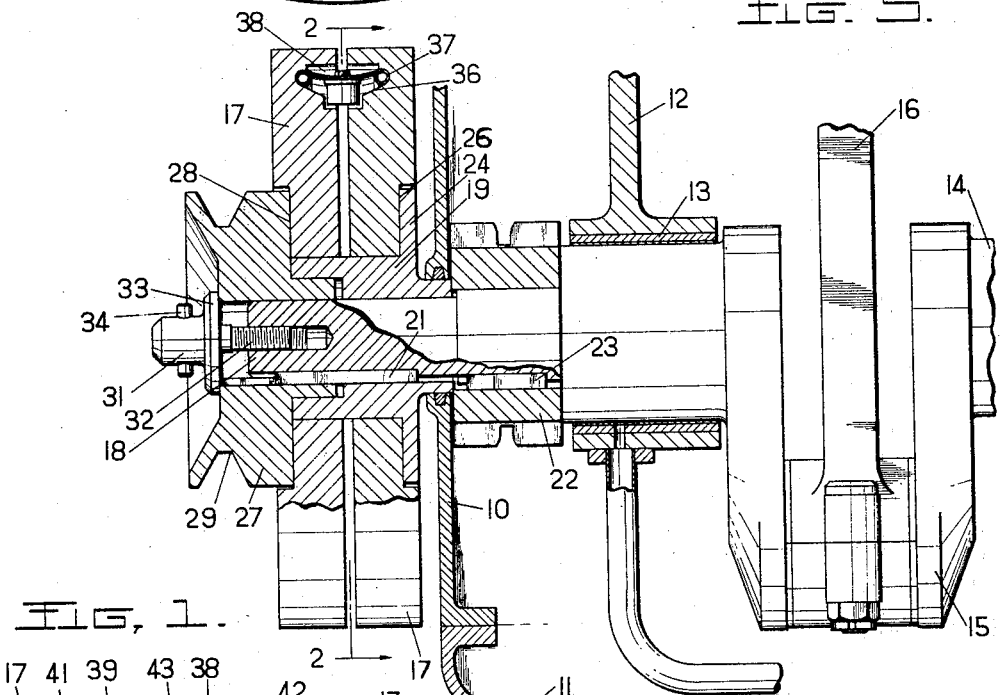
Fig. 1.
Fig. 3.
Inventor
WALTER R. GRISWOLD.
By Milton Tillett
Attorney Patented Feb. 28, 1933

1,899,324

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed October 15, 1928. Serial No. 312,508.

This invention relates to internal combustion engines and more particularly to means for controlling torsional vibration in the crank shafts of such engines.

It has for one of its objects to provide a simple and effective device adapted to frictionally damp torsional vibration in an engine shaft.

Another object of the invention is to provide a vibration damper having actuating means which is resilient to secure frictional engagement of the damper member, and which is also responsive to centrifugal force to increase the damping at the higher shaft speeds.

Another object of the invention is to provide a vibration damper having speed responsive actuating means to increase the damping at the higher speeds which will not stick or bind, so that the damper shall be free from unbalance resulting from the actuating mechanism.

A further object of the invention is to provide a vibration damper which shall be inexpensive to construct and easy to assemble, and which shall be readily accessible for inspection and adjustment without removing or otherwise disturbing adjacent parts of the engine.

Other objects of the invention will appear from the following description taken in connection with the drawing, which forms a part of this specification, and in which:

Fig. 1 is a longitudinal vertical section through part of an internal combustion engine provided with a vibration damper constructed in accordance with this invention;

Fig. 2 is a sectional view, partly broken away, taken substantially on the line 2—2 of Fig. 1;

Fig. 3 is an enlarged detail section of the damper actuating means shown in Fig. 1, illustrating the attachment of the weight members;

Fig. 4 is a detail section showing a modification of the invention, and

Fig. 5 is a detail section showing the actuating means of the device illustrated in Fig. 4 in its free position.

Referring to the drawing, in Fig. 1 at 10 is represented a crank case of an internal combustion engine, having a lower cover or oil pan 11 and provided with transverse webs, such as shown at 12. These webs support suitable aligned bearings 13 for an engine crank shaft 14, which has the usual integral cranks 15, each of which is connected by a connecting rod 16 to a piston mounted in one of the engine cylinders. The piston and cylinder are not shown in the drawing, but are of usual construction.

The damping means of this invention is illustrated as mounted at or adjacent the end of the crank shaft 14. It is in the form of a pair of similar cylindrical inertia members 17 mounted coaxially with the crank shaft on a suitable part thereof, and adapted to engage suitable friction means. As shown, this bearing part of the crank shaft is a forwardly projecting reduced portion 18 on which a bearing or retaining member 19 is keyed as indicated at 21. The axial position of the bearing member 19 on the crank shaft is determined by a gear or chain sprocket 22 which may be keyed or otherwise secured on the reduced crank shaft portion 18 as indicated at 23 if desired, and used to drive the engine cam shaft and other engine accessories, which are not shown in the drawing. This bearing member 19 is formed with an integral flange 24, presenting a forwardly disposed friction surface 26 adapted for cooperation with the rearwardly disposed face of the adjacent inertia member 17 to produce damping friction upon relative rotative movement.

The member 19 and the inertia member 17 are retained in axial position on the shaft by a gear or pulley 27, mounted upon the reduced shaft portion 18 and presenting a rearwardly disposed friction surface 28 adapted to cooperate in damping relation with the forwardly disposed face of the adjacent inertia members 17. The pulley 27 is provided with a peripheral groove 29 for cooperation with a suitable belt by which it may drive the engine fan and water pump, or other engine accessories which are not shown in the drawing.

This pulley member 27 may be retained on the shaft 14 by a member 31 having an integral stud 32 threaded into the end of the shaft portion 18 and having a flange 33 adapted to engage the forward face of the pulley 27. The end of this member 31 may be formed with suitable teeth or lugs 34 for engagement with the usual hand starting crank for manually rotating the crank shaft for starting.

The inertia members 17 are rotatably mounted on the bearing member 19 and are axially spaced a slight amount. The adjacent faces of each of these members is provided near its periphery with an axially disposed groove 36 having a seat portion 37, which together form a peripheral chamber or space 38, within which the damper actuating means is mounted.

The damper actuating means of this invention comprises a resilient member 39, illustrated in Fig. 3 in the form of a spring ring, which is mounted in the peripheral space 38 between the inertia members 17. This member 39 is provided with suitable abutment portions which may be in the form of rolled edges 41, adapted to seat in and bear against the seat portions 37 of the grooves 36. In its initial condition the ring 39 is preferably flat, but in assembly between the inertia members it is placed under an initial compression by the clamping action of the retaining member 31, so that it is bowed or sprung in cross section as clearly shown in Figs. 1 and 3. It thus exerts an axial force tending to separate the inertia members 17 and urges these into frictional engagement with the respective cooperating surfaces 26 and 28. In this way initial damping friction is insured, and damping of shaft vibrations at the lower shaft speeds is provided.

In damping devices of the character designated it is desirable to increase the damping effect as the shaft speed increases, and this result is also secured by the construction of the actuating member. Because of its bowed shape the member 39 constitutes a resilient toggle, the expansion or flattening of which greatly increases the axial pressure, and consequently the damping friction, between the members 17 and their cooperating friction surfaces. To secure such expansion or flattening of the toggle member 39 in response to speed changes in the shaft, spaced weight members 42 are secured to the inner surface of the member 39 at the central portion thereof in any convenient way, as by means of screws 43 passing through the member 39 and threaded into the members 42. The members 42 are of equal size and weight, and are evenly spaced to prevent unbalancing of the resilient toggle 39.

The operation of this device will be evident from the preceding description. Upon an increase in shaft speed the centrifugal force acting upon the weight members 42 tends to move these radially outward, thus exerting on the spring toggle 39 a radial force tending to flatten this member. This increases the end thrust on the abutments 37 and the resulting increase of axial pressure increases the damping friction between the inertia members 17 and the friction faces.

As there is no movement between the toggle abutment portions 41 and their cooperating abutments 37 and as there are no jointed portions in this actuating mechanism, there is no chance of any sticking or binding of the parts. The expansible toggle 39 will therefore bend uniformly and will not be more deformed in one portion than in another, in this way avoiding distortion and unbalance of the damping device.

In Figs. 4 and 5 is shown a vibration damper having a modified form of the actuating mechanism. In this form of the device the actuating member consists of a ring member 46 formed preferably of a resilient substance such as rubber impregnated with a heavy material such as lead. This actuating member 46 is provided with circumferential flanges 47 adapted to fit in suitable grooves 48 in the inertia members 17 and preferably to be rigidly secured therein. The shape in cross section of this member is shown in Fig. 5 and it will be evident that when placed in position between the inertia members 17 it is bowed or sprung into the position shown in Fig. 4, so as to provide a resilient toggle member similar to the toggle member 39 shown in Figs. 1 and 3. Because of its resilience, the member 46 tends to separate the inertia members 17 so as to provide initial damping, and by reason of its loading, it has considerable inertia so that it will tend to bend or deform radially upon an increase in speed, thus acting as a toggle to increase the damping friction upon an increase in speed.

It will be evident that this invention provides a simple and effective vibration damper having a single actuating element which is capable of initial expansion to provide damping friction at the lower shaft speeds, and also of increasing the pressure between the friction surfaces to increase the damping effect as the shaft speed increases.

It will also be apparent that since the expansive movement of the actuating mechanism occurs wholly by deformation of the resilient toggle member, and since there is no movement between this member and its abutments or supports, there can be no sticking or binding of the parts such as to interfere with the operation of the damper or cause unbalance in the engine.

It will be understood that various forms of the invention other than those described above may be used without departing from the spirit or scope of the invention.

Having thus described the invention, what is claimed and desired to be secured by Letters Patent is:

1. A vibration damper for shafts comprising a bearing at the end of the shaft, inertia members rotatably mounted on said bearing, friction means connected to the shaft and axially engaging said inertia members, and resilient toggle means between said inertia members to increase the frictional engagement with said friction means.

2. A vibration damper for shafts comprising inertia members supported for rotation with respect to the shaft, friction members connected to the shaft and axially engageable by said inertia members, and resilient means responsive to speed variations including a toggle expansibly mounted between the inertia members.

3. A vibration damper for shafts comprising friction members secured thereto, inertia members supported for rotation with respect to the shaft between the friction members, and a resilient toggle member between said inertia members.

4. A vibration damper for shafts comprising friction members secured to the shaft, inertia members supported for rotation with respect to the shaft between said friction members, and actuating means between said inertia members including a resilient toggle ring and spaced weight members secured to said ring.

5. A vibration damper for shafts comprising friction members secured thereto, inertia members supported for rotation with respect to the shaft between the friction members, a resilient toggle member between said inertia members, and weight members responsive to centrifugal force adapted to expand said toggle member.

6. A vibration damper for shafts comprising a flange secured to said shaft providing an axially disposed friction surface, a pair of inertia members supported for rotation with respect to the shaft adjacent said flange, means to retain said inertia members on the shaft defining a second friction surface, resilient toggle means between the inertia members urging said inertia members into frictional engagement with said surfaces respectively, and weight members responsive to centrifugal force carried by said toggle means to increase the friction upon increase of speed.

7. A vibration damper for engine shafts comprising a bearing member secured to the shaft and having an axially disposed flange providing a friction surface, a member secured to said shaft providing an oppositely disposed friction surface, a pair of inertia members rotatably mounted on the bearing member between said flange and member cooperating respectively with said friction surfaces, a resilient toggle member between the inertia members urging them axially into frictional engagement with the friction surfaces, and weight members secured to the toggle member to increase the axial pressure thereof as the speed increases.

8. In a vibration damper for shafts comprising a friction member secured to the shaft, an inertia member supported for rotation with respect to said friction member, and a toggle device operable in response to centrifugal force to effect frictional engagement between said friction and inertia members.

9. In a vibration damper for shafts comprising a friction member secured to the shaft, an inertia member rotatably carried by the shaft, a toggle device adapted to effect frictional engagement of said members, and weight members operable in response to centrifugal force to actuate said toggle device to vary the friction with increased shaft speed.

10. In a vibration damper for shafts comprising an inertia member mounted for rotation and axial movement with respect to the shaft, a friction member secured to the shaft adjacent said inertia member, a resilient toggle device operable to urge said inertia member axially into contact with said friction member, and speed responsive means associated with said toggle device and operable thereon to increase the pressure of said contact with higher shaft speeds.

11. A vibration damper for shafts comprising friction members secured thereto, inertia members mounted for rotation with respect to the shaft between the friction members, a toggle device between the inertia members, and a weight member responsive to centrifugal force operatively connected to said toggle member to expand the same.

12. A vibration damper for shafts comprising relatively movable friction and inertia members carried by the shaft, and means including a toggle device carried by one of said members and exerting thrust thereon to effect frictional engagement between said members.

13. A vibration damper for a shaft comprising an inertia member mounted for rotation with respect to the shaft, a member mounted for rotation with the shaft and having a frictional connection with said inertia member, one of said members being movable axially of the shaft with respect to the other to vary the friction, and means responsive to variation in the speed of rotation of the shaft operatively connected to one of said members to move the same axially, said last named means including a thrust element rotating with the member to be moved, and a weighted toggle interposed between the member to be moved and said element.

14. A vibration damper for a shaft comprising an inertia member and a thrust member, said members being mounted for rotation with respect to said shaft, an abutment carried by said shaft for limiting axial movement of said inertia member and having frictional connection therewith, and speed responsive means to move said inertia member axially to vary the friction, said means including a continuous annular resilient element interposed between said members and exerting an initial thrust therebetween.

15. A vibration damper for a shaft comprising an inertia member and a thrust member, said mambers being mounted for rotation with respect to said shaft, an abutment carried by said shaft for limiting axial movement of said inertia member and having frictional connection therewith, and speed responsive means to move said inertia member axially to vary the friction, said means including a resilient element interposed between said members and initially tensioned to exert a direct thrust therebetween, and means having substantial mass movable in response to centrifugal force and connected with said element to vary the thrust exerted thereby as the speed of the shaft is varied.

16. A vibration damper for a shaft comprising an inertia member and a thrust member, said members being mounted for rotation with respect to said shaft, an abutment carried by said shaft for limiting axial movement of said inertia member and having frictional connection therewith, and speed responsive means to move said inertia member axially to vary the friction, said means including an annular element interposed between said members and initially bowed to exert thrust therebetween, and means having substantial mass movable in response to centrifugal force and connected with said element to vary the thrust exerted thereby as the speed of the shaft is varied.

17. A vibration damper for a shaft comprising an inertia member and a thrust member, said members being mounted for rotation with respect to said shaft, an abutment carried by said shaft for limiting axial movement of said inertia member and having frictional connection therewith, and speed responsive means to move said inertia member axially to vary the friction, said means including an annular element interposed between said members and initially bowed to exert thrust therebetween, and means having substantial mass movable in response to centrifugal force and connected with said element to vary the thrust exerted thereby as the speed of the shaft is varied, said element and said last named means being integral.

In testimony whereof I affix my signature.

WALTER R. GRISWOLD.